W. A. TURBAYNE.
DYNAMO ELECTRIC MACHINE.
APPLICATION FILED JULY 20, 1915. RENEWED AUG. 30, 1920.

1,366,545.

Patented Jan. 25, 1921.
2 SHEETS—SHEET 1.

Witnesses
B. H. Caldwell
G. P. Brooks.

Inventor
William A. Turbayne
By Raymond H. Van Nest
Attorney

W. A. TURBAYNE.
DYNAMO ELECTRIC MACHINE.
APPLICATION FILED JULY 20, 1915. RENEWED AUG. 30, 1920.

1,366,545. Patented Jan. 25, 1921.
2 SHEETS—SHEET 2.

Witnesses
B. H. Caldwell
G. P. Brooks.

Inventor
William A. Turbayne
By Raymond H. Van Nest
Attorney

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

DYNAMO-ELECTRIC MACHINE.

1,366,545. Specification of Letters Patent. Patented Jan. 25, 1921.

Application filed July 20, 1915, Serial No. 40,838. Renewed August 30, 1920. Serial No. 407,063.

*To all whom it may concern:*

Be it known that I, WILLIAM A. TURBAYNE, a citizen of the United States, residing at Niagara Falls, in the county of Niagara and State of New York, have invented new and useful Improvements in Dynamo-Electric Machines, of which the following is a specification.

This invention relates to improvements in dynamo-electric machines.

More particularly the invention relates to a dynamo-electric machine adapted for use as a starting motor and battery charging generator in an automobile starting and lighting system.

In such systems a single dynamo-electric machine performs both functions, acting first as a motor to start the engine and thereafter as a generator to supply current. This is known as the single unit system as distinguished from the system in which separate machines perform the functions of motor and generator, known as the double unit system. In a single unit system the dynamo-electric machine is mechanically connected by gears, or otherwise, to the engine crank shaft. A storage battery is connected across the terminals of the machine. The storage battery furnishes current to operate the machine as a motor to start the engine, and after the engine begins to operate under its own power, the dynamo-electric machine is operated by the engine as a generator to charge the storage battery and supply lamps or other translating devices on the automobile. The speed of the engine, and hence the speed of the generator, varies widely. It is desirable to maintain the output of the generator within predetermined limits, regardless of the generator speed, so as to prevent injury to the battery and to provide a proper charging current therefor. In practice it is often desired to hold the output substantially constant, notwithstanding speed variations. This result has generally been accomplished heretofore in practice by employing a regulator in the field circuit to vary the field resistance inversely as the speed. This regulator is mechanically or electro-magnetically operated.

In some recent systems the generator output has been maintained at the proper value without the use of an external regulator, the generator inherently delivering the proper current under varying speed conditions. The electrical conditions in a single unit system are peculiar and present many difficulties in obtaining proper inherent output control. The machine must be capable of exerting a very high torque for a short time when acting as a starting motor. When acting as a generator, however, the output must be held to a very low value, as the storage batteries employed are small and the current required for charging is correspondingly small. Obviously, these conditions demand dynamo-electric machines of widely different characteristics. To obtain the required starting torque it is necessary to provide a low resistance armature of relatively few conductors, capable of carrying a very high current in starting. The magnetizing effect or armature reaction from such an armature is very small and cannot be relied upon in the ordinary manner to give any substantial degree of regulation to hold the relatively low output demanded when the machine operates as a generator.

According to the present invention, means are provided to augment the effect of the armature so that the effective field flux may be held within proper limits to cause the proper generator current.

An object of the present invention is to provide improved means whereby the generator will deliver a proper charging current for the battery, notwithstanding wide variations in generator speed.

A further object of the invention is to provide a generator having improved means for maintaining a substantially constant output when operating at widely varying speeds.

These and other objects are attainable by the embodiment of the invention herein described and illustrated in the accompanying drawings.

In the drawings:—

Figure 1:
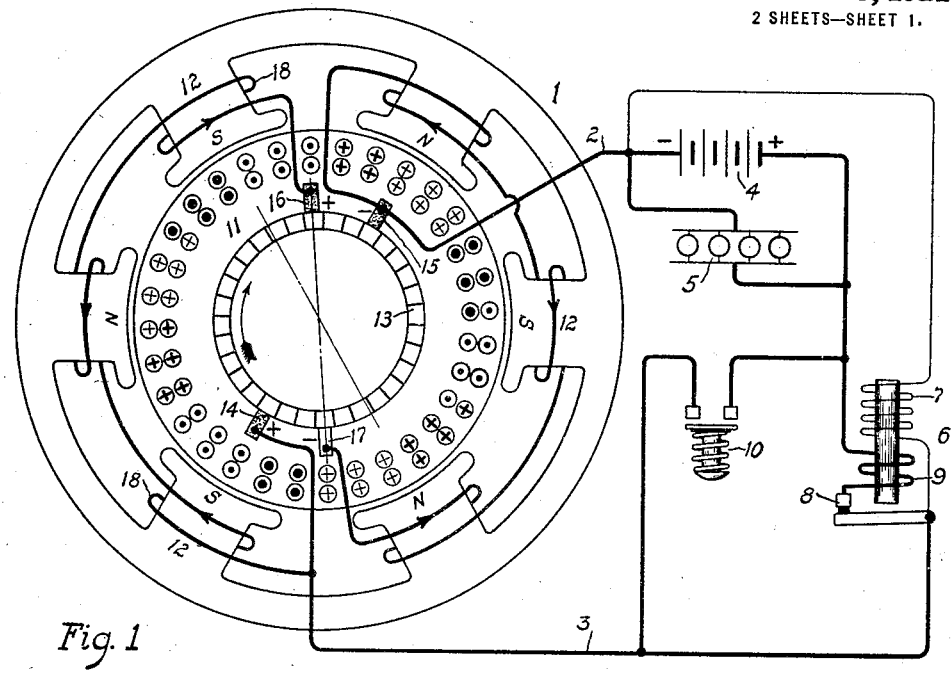
Figure 1 represents diagrammatically a dynamo-electric machine and the electric circuits of a starting and lighting system.

The complete system as represented in Fig. 1, includes a dynamo-electric machine, having a main circuit 2, 3, across which a storage battery 4 and lamps 5 are connected in parallel branches. The dynamo-electric machine is herein referred to either as a motor or a generator, depending upon the phase of its operation under discussion.

An automatic switch 6 is connected in one of the the main leads. This switch has a shunt lifting coil 7 adapted when sufficiently energized to close the main circuit between the generator and battery at the contacts 8. The switch also has a series holding coil 9 in series in one generator lead and in series with the contacts 8. The switch 6 is of any preferred construction. It is adapted to close the main circuit when the generator voltage substantially equals the battery voltage. When the generator is at rest or operating at low speed, the battery tends to discharge through the generator and hence the current is reversed in the holding coil 9 which then opposes the lifting coil 7 and causes the switch to open.

The starting switch 10, operable at will by the operator, is connected across the contacts of the automatic switch and serves when closed to connect the battery directly to the motor, whereby the motor is operated from the battery to crank the engine. The starting switch is herein illustrated diagrammatically as a manually operated normally open switch, but it may be variously modified and otherwise operated, if desired.

The dynamo-electric machine has a rotating armature and a stationary field. The armature may be either of the ring or drum types. In the embodiment of the invention herein chosen to illustrate the principles of the invention, the armature 11 is of the drum type and the field has six symmetrically arranged poles 12. The armature is provided with a two-path series wave winding having symmetrical end connections, so that points of maximum difference of potential on the commutator 13 will be in line with the centers of poles of opposite polarity spaced substantially 180 electrical degrees apart.

In Fig. 1 the main positive brush 14 is in line with a south pole and main negative brush 15 is in line with the diametrically opposite north pole. Obviously, additional main brushes may be provided, if desired, in which case brushes of like polarity will be symmetrically arranged with respect to the corresponding poles and will be connected in parallel.

A pair of auxiliary brushes 16 and 17 are provided, angularly advanced on the commutator with respect to the main brushes in the direction of rotation of the armature. A difference of potential will therefore exist between main brush 14 and the corresponding auxiliary brush 16 and between main brush 15 and the corresponding auxiliary brush 17. This difference of potential existing between the main and auxiliary brushes will depend on the amount of advance of the auxiliary brushes. As will be noted from Figs. 1 and 2, the auxiliary brushes are located less than 90 electrical degrees from their corresponding main brushes, whereby those armature conductors are connected to carry the field exciting current which will direct flux to aid the generator in building up. In low voltage machines, such as lighting generators for motor cars wherein a heavy field current is used, this field current in the armature conductors is of great importance.

The field poles 12 are provided with windings 18 connected between the main and auxiliary brushes. With the brush arrangement illustrated, brush 14 is at higher potential than brush 16, so that current will flow from brush 14 to brush 16. Also brush 17 will be of higher potential than brush 15, so that current will flow from brush 17 to brush 15. Three of the field windings are supplied by current flowing between brushes 14 and 16 in the direction indicated by the arrows in Fig. 1 and the remaining three field windings are supplied by current flowing between brushes 17 and 15 in a direction indicated by the arrows, so that adjacent field poles are of opposite polarity. Thus, while the entire armature windings furnish current to the external circuit, only a predetermined portion of the armature windings furnishes the exciting current for the field. The number of armature conductors furnishing the field current is determined by the relative position of the brushes.

Figure 2:
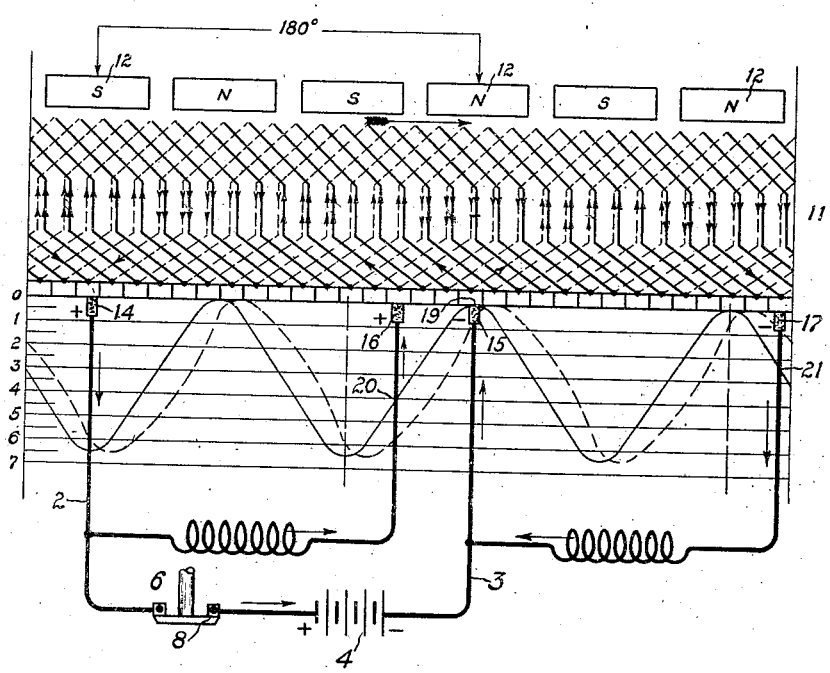
Fig. 2 is a diagrammatic development of the armature windings and illustrates diagrammatically the manner in which the generator output is determined.

Fig. 2 illustrates clearly the relative arrangement of brushes and windings. The automatic switch 6 is shown closed and consequently the circuit arrangement is that existing when the generator is supplying current to the battery. Positive brush 14 is in line with the center of one of the south poles, and negative brush 15 is in line with the center of a north pole spaced 180 electrical degrees from the former. One set of field windings is represented as connected across brushes 14 and 16 and the other set is connected across brushes 17 and 15. Current to the battery and external circuits is supplied through the main brushes 14 and 15.

When the armature is rotating and before the automatic switch closes, current for the field will flow in the armature conductors embraced between the auxiliary brushes and their corresponding main brushes. In Fig. 1 the conductors carrying this field current are indicated by the heavy crosses and dots, the crosses indicating that the current is flowing in the conductors downwardly, or away from the observer, and the dots that the current is flowing upwardly or toward the observer. In Fig. 2 the same conductors are indicated by the double arrows which also indicate the direction of current. The field windings are of relatively few turns of low resistance conductors so that a heavy current immediately flows in the armature conductors used to supply the field circuit. The position of these conductors with relation to the poles is such, as illustrated especially in Fig. 1, that they exert a compounding action and aid the field flux, so that the generator rapidly builds up. At this time the remaining armature conductors carry no current and hence exert no distorting effect on the effective field flux.

As soon as the generator voltage is sufficiently high, the automatic switch closes and all armature conductors are carrying current. The conductors indicated in Fig. 1 by the lighter crosses and dots and in Fig. 2 by the single arrows, carry only the current for the external circuit, while those which previously carried the field current now carry the sum of these currents. The entire armature conductors now set up a flux at right angles to the field flux, consequently tending to shift the effective field flux in the direction of rotation. As the speed of rotation increases, or for any other cause the current increases, this tendency to shift the effective flux is increased.

Fig. 2 also indicates the effect on the generator produced by this shifting of the effective flux. The curves below the commutator represent the distribution of voltage around the commutator. The full line curve represents the voltage conditions which would exist if no current were flowing in the armature, such, for example, as if the machine were separately excited. The broken line curve represents the conditions that exist at a predetermined speed and load upon the generator. The curves show the distortion of the point of maximum voltage in the direction of rotation of the armature, due to the distortion or shifting of the effective flux axis caused by the reaction of the armature current. For the purpose of illustration there is selected a six-volt system—that is, one employing a three cell battery. The values are given merely for the purpose of illustrating the principles of the invention, as obviously the system is adapted for use under a great variety of conditions and with batteries of various sizes. The voltage curves are plotted with the face of the commutator as the base line. The figures at the left of Fig. 2 indicate volts. The maximum difference of potential between the main positive and negative brushes at no load is represented as $6\frac{1}{2}$ volts, which is approximately the voltage of a 3-cell lead battery at the beginning of charge. Before the external circuit is closed and consequently while there is substantially no distorting effect on the flux, the main positive brush 14 is located at the point of maximum positive voltage, while the main negative brush 15 is on the zero line at the point 19. Auxiliary brush 16, forming one terminal of the field winding, is represented by the point 20 on the voltage curve as having a positive voltage value of 4 volts, so that there is a potential difference of $2\frac{1}{2}$ volts between brushes 16 and 14 which forms the other terminal of the left hand field winding in Fig. 2. Similarly, auxiliary brush 17, as indicated by the point 21 on the voltage curve, has a potential $2\frac{1}{2}$ volts higher than that existing at brush 15, so that current through the right hand field windings in Fig. 2, will flow from brush 17 to brush 15. In the development of the armature winding, this field exciting current is indicated in the armature conductors by the lower arrow heads.

After the automatic switch closes and current is being supplied to the battery and external circuits, current will flow in all of the armature conductors in a direction indicated by the upper arrows on the winding development. It will be seen, therefore, that certain of the armature conductors carry not only the current to supply the external circuits, but also the current for exciting the field. The current in the armature conductors, as above explained, exerts a magneto motive force at right angles to the magneto motive force imparted by the shunt fields, with the result that the effective flux is distorted in the direction of rotation, and consequently the points of maximum E. M. F. on the commutator are similarly shifted forward, as indicated by the broken curve on Fig. 2. At a certain generator speed and under certain load conditions, the broken line curve accurately represents the existing voltage values. Comparing the values indicated in the broken curve with those indicated in the full line curve, it is apparent that the voltage of brush 16 has risen to approximately $5\frac{1}{2}$ volts, while the voltage on brush 14 has dropped to 6 volts, so that the potential difference between these brushes is only $\frac{1}{2}$ volt predominating on brush 14, as compared with the $2\frac{1}{2}$ volts potential difference indicated by the full line curve. This causes the circulation of only a small current through the left hand field winding. A similar variation in potential difference between brushes 17 and 15 exists, so that only a similarly small current will circulate through the right hand field winding. The number of turns on the field poles and the positions of the brushes are so selected as to hold the generator output within narrow limits, regardless of speed increases. By selection of the position of the auxiliary brushes, the amount of current in the heavier loaded armature conductors may be varied. An increase in armature current causes an increased shifting of the flux axis and causes the potential of the auxiliary brushes to more nearly approach that of the corresponding main brushes. The position of the auxiliary brushes is therefor selected such as to give the desired output which will be held substantially constant as the speed increases. As indicated on Fig. 2, the current output is limited, not only by decreasing the potential difference existing between the brushes supplying the field windings, but also by a slight reduction in the potential difference between main brushes 14 and 15, due, likewise to the shifting of the flux. The combined effects, therefore, of reducing the field excitation and reducing the effective potential across the main brushes as the speed of the armature increases, will hold the generator output to approximately a constant value, regardless of the armature speed.

The armature current can never, under any speed conditions, attain such a value that the voltage at the main and auxiliary brushes is exactly the same, as such a condition would represent zero current in the fields and of course, the machine would not be capable of producing an E. M. F. A certain difference of potential will always exist between the main and auxiliary brushes in order that the field excitation, and therefore the machine voltage, may be sustained.

Figure 3:
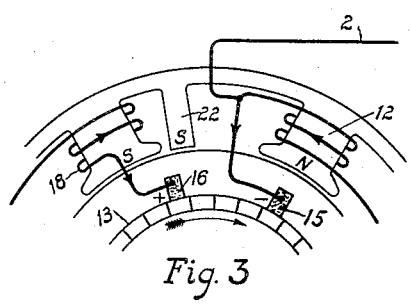
Figs. 3 and 4 illustrate diagrammatically modifications of the generator field windings.

In some machines, especially where there are relatively few armature conductors rotating in a strong magnetic field, it is desirable to provide means for still further accentuating the distorting effects of the armature current. This may be accomplished as illustrated in Fig. 3, by providing a small auxiliary pole 22 placed slightly in advance of the main pole.

Figure 4:
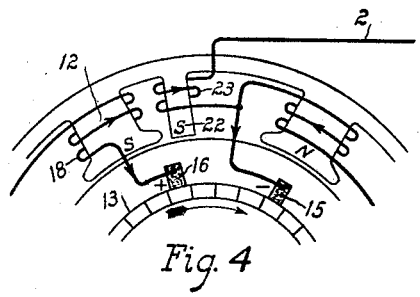

This effect may be still further increased as illustrated in Fig. 4, by applying a winding 23 to the auxiliary pole 22, this winding being connected in series in the external circuit and wound in such a manner that its polarity is the same as the main pole adjacent thereto.

The machine may be operated as a motor to start the engine by closing the starting switch 10, thus connecting the battery directly to the main brushes. Current will flow from the positive pole of the battery to the motor, a portion passing around the field windings, while the main portion flows directly through the armature winding. The field windings are so arranged that they will excite the field magnet in the proper direction to cause the machine to operate as a motor in the same direction as when it is operating as a generator.

What I claim as new and desire to secure by Letters Patent of the United States is—

1. In a dynamo-electric machine, in combination, field poles and an armature having conductors, main brushes located substantially at points of maximum potential difference when said machine is operated as a generator on open circuit, auxiliary brushes connected with said main brushes for supplying excitation for said field poles, said auxiliary brushes being spaced in advance of their corresponding main brushes less than 90 electrical degrees.

2. In a dynamo-electric machine, in combination, field poles and an armature having conductors, main brushes located substantially at points of maximum potential difference when said machine is operated as a generator on open circuit, an auxiliary brush angularly advanced less than 90 electrical degrees from each main brush and connected therewith for supplying excitation for said field poles, each main brush and its coöperating auxiliary brush embracing armature conductors positioned to set up flux to aid the field poles in building up.

3. In a dynamo-electric machine adapted to operate as an engine starting motor or as a generator, field poles and an armature having conductors of low resistance, main brushes located substantially at points of maximum potential difference when said machine is operated as a generator on open circuit, an auxiliary brush connected with each of said main brushes for supplying excitation for said field poles, said auxiliary brushes being spaced in advance of their corresponding main brushes less than 90 electrical degrees.

4. In a dynamo-electric machine, in combination, field poles and an armature having conductors, main brushes located substantially at points of maximum potential difference when said machine is operated as a generator on open circuit, auxiliary brushes connected with said main brushes for supplying excitation for said field poles, each of said auxiliary brushes being located in advance of its corresponding main brush less than 90 electrical degrees in the direction of armature rotation.

In witness whereof, I have hereunto subscribed my name.

WILLIAM A. TURBAYNE.